US012387634B1

(12) United States Patent
Mason, Jr.

(10) Patent No.: US 12,387,634 B1
(45) Date of Patent: Aug. 12, 2025

(54) INFLATABLE DECORATION WITH INTEGRATED COMBINATION BLOWER AND PROJECTOR

(71) Applicant: David Paul Mason, Jr., Charlotte, NC (US)

(72) Inventor: David Paul Mason, Jr., Charlotte, NC (US)

( * ) Notice: Subject to any disclaimer, the term of this patent is extended or adjusted under 35 U.S.C. 154(b) by 16 days.

(21) Appl. No.: 18/238,296

(22) Filed: Aug. 25, 2023

Related U.S. Application Data

(60) Provisional application No. 63/400,924, filed on Aug. 25, 2022.

(51) Int. Cl.
*G03B 21/58* (2014.01)
*G09F 19/00* (2006.01)
*G09F 19/18* (2006.01)
*G03B 21/585* (2014.01)

(52) U.S. Cl.
CPC ............ *G09F 19/008* (2021.05); *G09F 19/18* (2013.01); *G03B 21/585* (2013.01)

(58) Field of Classification Search
CPC ...... G09F 19/008; G09F 19/18; G09F 353/79; G03B 21/10; G03B 21/145; G03B 21/16; G03B 21/58; G03B 21/585
USPC .......................................................... 353/79
See application file for complete search history.

(56) References Cited

U.S. PATENT DOCUMENTS

| 3,586,432 | A | * | 6/1971 | Pentes, Jr. ............. | G03B 37/00 353/74 |
| 4,240,721 | A | * | 12/1980 | Drop, Sr. ............... | G03B 21/58 353/74 |
| 9,307,183 | B1 | | 4/2016 | Duchaj et al. | |
| 10,713,981 | B2 | | 7/2020 | De Grasse et al. | |
| 11,061,304 | B2 | | 7/2021 | Barnett et al. | |
| 11,402,739 | B2 | * | 8/2022 | Tscharntke ............. | G03B 21/10 |
| 2002/0171927 | A1 | * | 11/2002 | Barnes, III .............. | G09F 19/18 359/451 |
| 2013/0050664 | A1 | | 2/2013 | Morohoshi | |
| 2016/0006997 | A1 | | 1/2016 | Bouie et al. | |
| 2016/0109791 | A1 | * | 4/2016 | Chan ...................... | G03B 21/10 353/79 |
| 2018/0284587 | A1 | | 8/2018 | Barnett et al. | |
| 2023/0023357 | A1 | * | 1/2023 | Deutsch ................. | A63H 33/22 |

FOREIGN PATENT DOCUMENTS

KR 20160084753 * 7/2016

* cited by examiner

*Primary Examiner* — Cassandra Davis
(74) *Attorney, Agent, or Firm* — Schwartz Law Firm, P.C.

(57) ABSTRACT

A constant-air inflatable decoration has an inflatable body defined by walls and an inflation port formed with one of the walls. A blower is located at the inflation port and incorporates a blower fan adapted for generating continuous airflow from an outside of the inflatable body to an inside of the inflatable body. The blower operates to continuously force air into the inflatable body to maintain an inflated three-dimensional shape. A projector is mounted adjacent the blower and faces inside the inflatable body. The projector incorporates a light source and a projection lens configured for magnifying and casting an image onto an opposite display surface of the inflatable body. The projector resides within a direct path of airflow generated by the blower fan, thereby continuously cooling the light source of the projector during operation of the blower.

19 Claims, 13 Drawing Sheets

FIG. 2
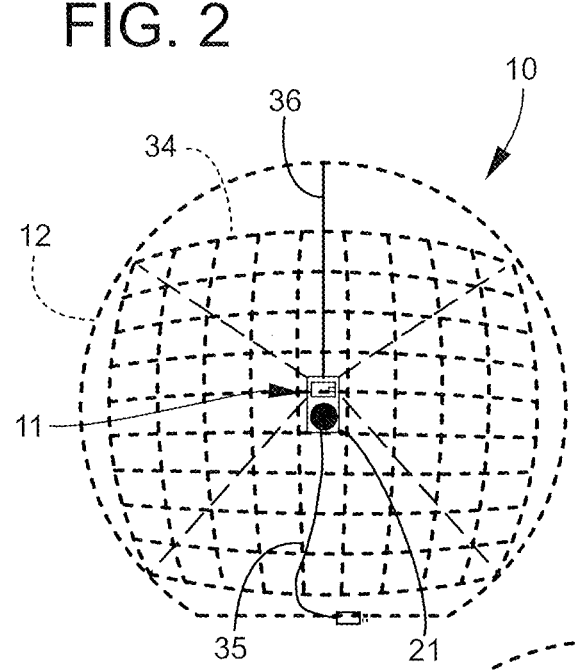
FIG. 3
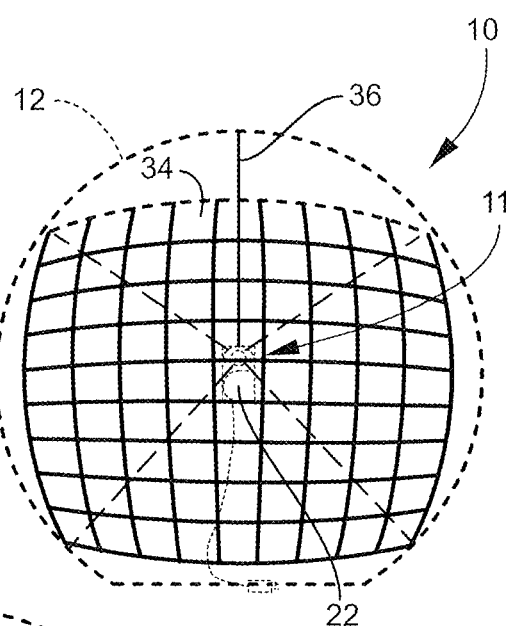
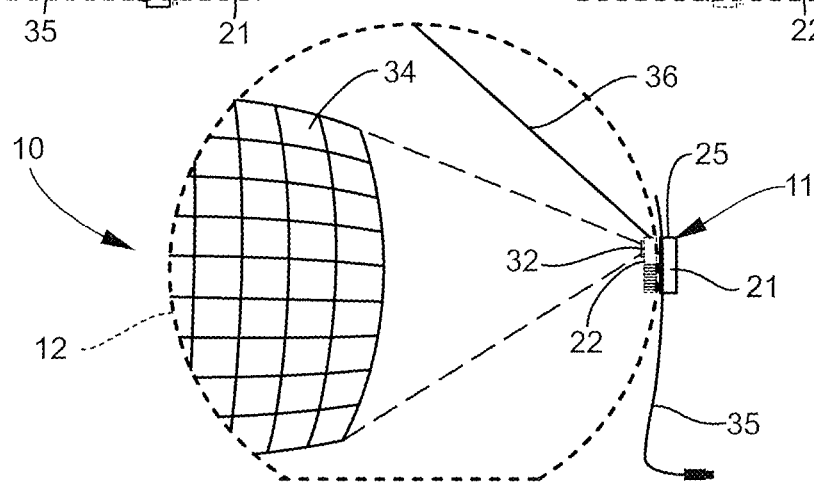
FIG. 4

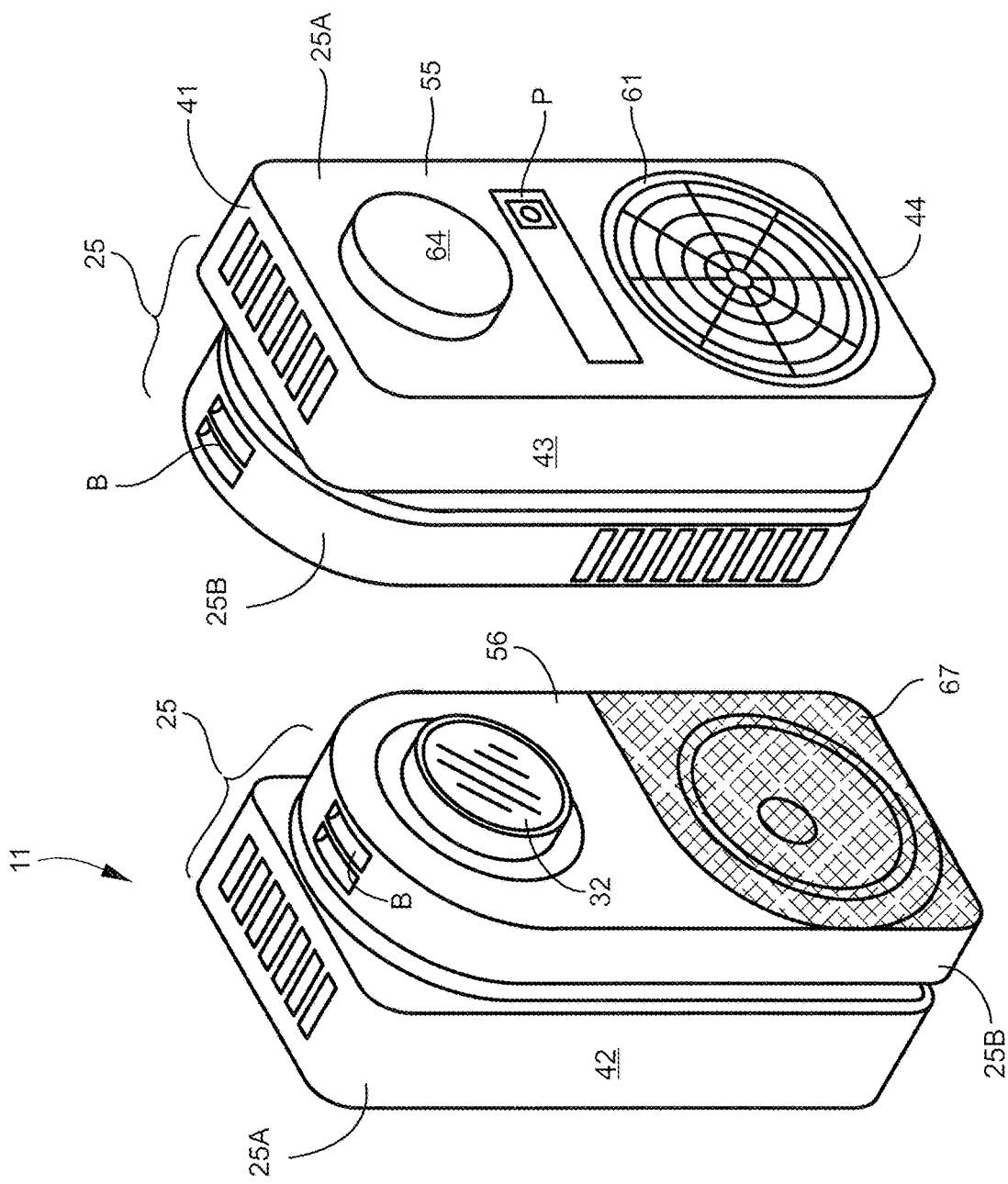

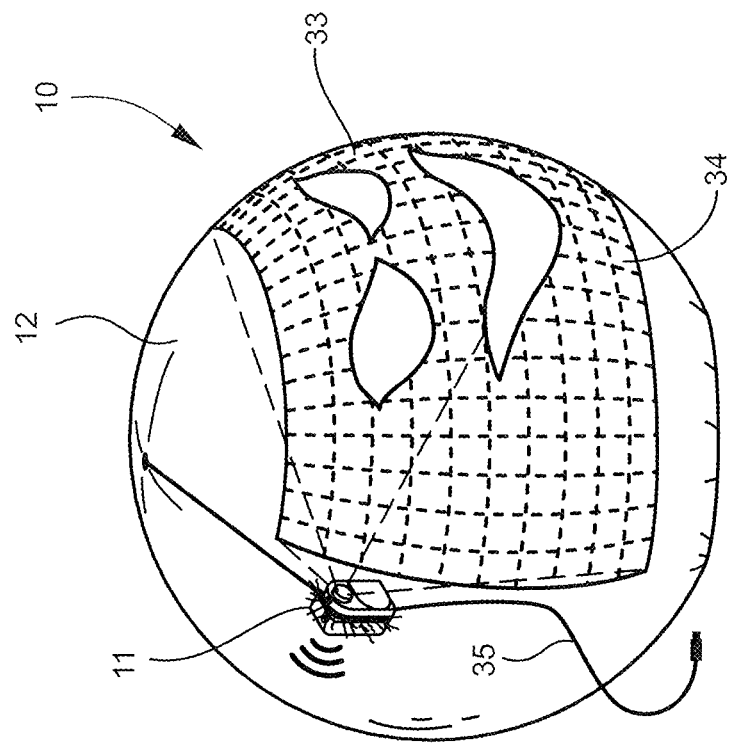
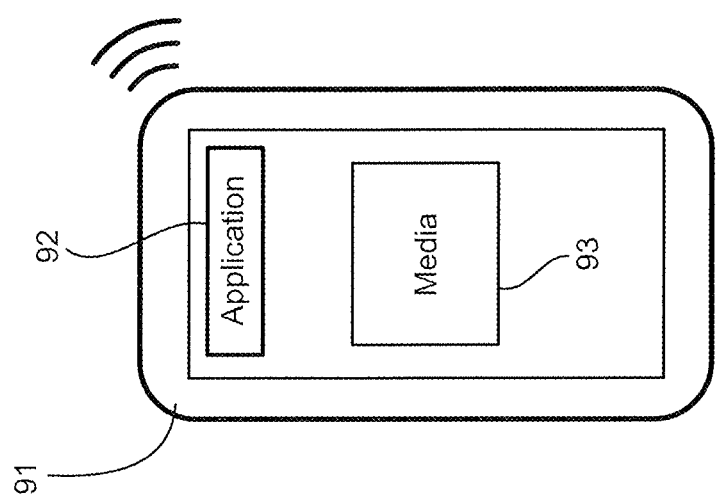
FIG. 13

INFLATABLE DECORATION WITH INTEGRATED COMBINATION BLOWER AND PROJECTOR

TECHNICAL FIELD AND BACKGROUND OF THE DISCLOSURE

The present disclosure relates broadly and generally to a constant-air inflatable decoration with an integrated combination blower and projector.

Constant-air inflatable characters and body shapes have become popular as outdoor decorative displays during holidays, like Halloween and Christmas, birthdays, special events and other such occasions. Such inflatables typically use a screen print or print-on-fabric method to render the face of a static character on a three-dimensional blowup body. The image of the character's face on the decoration never changes and cannot be changed. This limits the versatility of the display and creativity the owner, and caps product expandability and interest over time often creating a one-and-done or few-and-done use situation.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a constant-air (also referred to as "continuous air" or "cold air") inflatable decoration. The decoration has an inflatable body defined by walls, and an inflation port formed with one of the walls. A blower is located at the inflation port and incorporates a blower fan adapted for generating continuous airflow from an outside of the inflatable body to an inside of the inflatable body. The blower operates to continuously force air into the inflatable body to maintain an inflated three-dimensional shape. A projector is mounted adjacent the blower and faces inside the inflatable body. The projector incorporates a light source and a projection lens configured for magnifying and casting an image onto an opposite display surface of the inflatable body. The image cast onto the display surface is visible outside of the decoration. The projector resides within a direct path of airflow generated by the blower fan, thereby continuously cooling the light source of the projector during operation of the blower.

Examples of projectors with conventional features are disclosed in prior U.S. Pat. No. 9,307,183 and published Application Nos. US2013/0050664 and US2016/0006997. The complete disclosures of these publications are incorporated herein by reference. Exemplary projectors applicable in the present disclosure may comprise liquid crystal display (LCD) projectors and digital light processing (DLP) projectors.

One example of a detachable air blower for inflatables is disclosed in U.S. Pat. No. 10,713,981. The complete disclosure of this prior patent is incorporated herein by reference. Depending upon the size of the inflatable body, the exemplary blower may generate air flow between 50-500 CFM. In one exemplary calculation, cubic feet of airflow generated by the blower per minute is greater than one-quarter of the total volume of the inflatable body.

According to another exemplary embodiment, the blower and projector are integrally formed together in a single combined blower/projector unit. In alternative embodiments, the blower and projector are separately formed and operate independent of one another, but are arranged such that the continuous airflow generated by the blower channels cooling air directly towards and across the projector.

According to another exemplary embodiment, the blower/projector unit comprises a vented interior housing residing inside of the inflatable body and configured to simultaneously channel airflow to the light source of the projector and to the inside of the inflatable body.

According to another exemplary embodiment, the blower/projector unit further comprises a vented weather-resistant outside housing section residing outside of the inflatable body.

According to another exemplary embodiment, the blower/projector unit operatively connects to a single power source.

According to another exemplary embodiment, the blower/projector unit is releasably mounted to the wall of the inflatable body at the inflation port, such that the blower fluidly communicates with the outside of inflatable body and the projection lens of the projector faces inside the inflatable body.

According to another exemplary embodiment, the image comprises a single still frame.

According to another exemplary embodiment, the image comprises one of a moving sequence of images creating an animation. The source of the image or animation may comprise pre-rendered video or audiovisual files electronically stored on the projector's internal memory, or loaded using external storage devices, or streamed to the projector from a computer or mobile device. In one example, the animation comprises a singing jack-o-lantern face.

According to another exemplary embodiment, the inflatable body is constructed of a material selected from a group consisting of cloth, polyester, vinyl, nylon, polyvinyl chloride, PVC-coated vinyl and PVC-coated nylon.

According to another exemplary embodiment, the projector comprises integrated components selected from a group consisting of USB input, HDMI input, wireless video HDMI receiver, RGB computer input, internal speakers, Bluetooth receiver, Bluetooth transmitter, and built-in WiFi. In alternative embodiments, the combination blower/projector unit may operatively connect (e.g., wirelessly) to an external speaker or audio device.

According to another exemplary embodiment, the projector comprises ports for operatively connecting external nonvolatile electronic storage selected from a group consisting of a USB flash drive and an SD memory card.

According to another exemplary embodiment, the light source of the projector comprises one of a group consisting of a lamp and laser.

According to another exemplary embodiment, the projection lens of the projector comprises a short throw lens.

According to another exemplary embodiment, an internal guide line is attached to the projector and a wall of the inflatable body, such that the guide line serves to align the projection lens relative to the display surface upon inflation of the body.

According to another exemplary embodiment, the projector comprises a hand dial accessible from the outside of the inflatable body for manually adjusting an orientation of the projection lens.

In another exemplary embodiment, the present disclosure comprises a method for providing a constant-air inflatable decoration. The method includes locating a blower at an inflation port formed with an inflatable body of the decoration. The blower comprises a blower fan adapted for generating continuous airflow from an outside of the inflatable body to an inside of the inflatable body. The blower operates to continuously force air into the inflatable body to maintain an inflated three-dimensional shape. A projector is mounted adjacent the blower and faces inside the inflatable body. The projector comprises a light source and a projection lens configured for magnifying and casting an image onto a display surface of the inflatable body. The image cast onto the display surface is visible outside of the decoration. Using airflow generated by the blower fan, the light source of the projector is continuously cooled during operation of the blower.

According to another exemplary embodiment, the method includes operatively connecting a plurality of inflatable decorations to a single external media controller. The media controller has a plurality of individual media outputs designed to transmit audio and video data to a corresponding plurality of projectors.

According to another exemplary embodiment, the media controller further comprises at least one media input designed to receive audio and video data from external sources.

According to another exemplary embodiment, the method includes wirelessly connecting the media controller to a mobile device.

According to another exemplary embodiment, the method includes wirelessly connecting the projector to a mobile device.

BRIEF DESCRIPTION OF THE DRAWINGS

Exemplary embodiments of the present disclosure will hereinafter be described in conjunction with the following drawing figures, wherein like numerals denote like elements, and wherein:

FIGS. 2-4 are further views of the exemplary inflatable decoration;

FIGS. 8 and 9 are perspective views of the exemplary combination blower/projector unit;

FIGS. 12 and 13 illustrate further exemplary features of the present inflatable decoration;

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
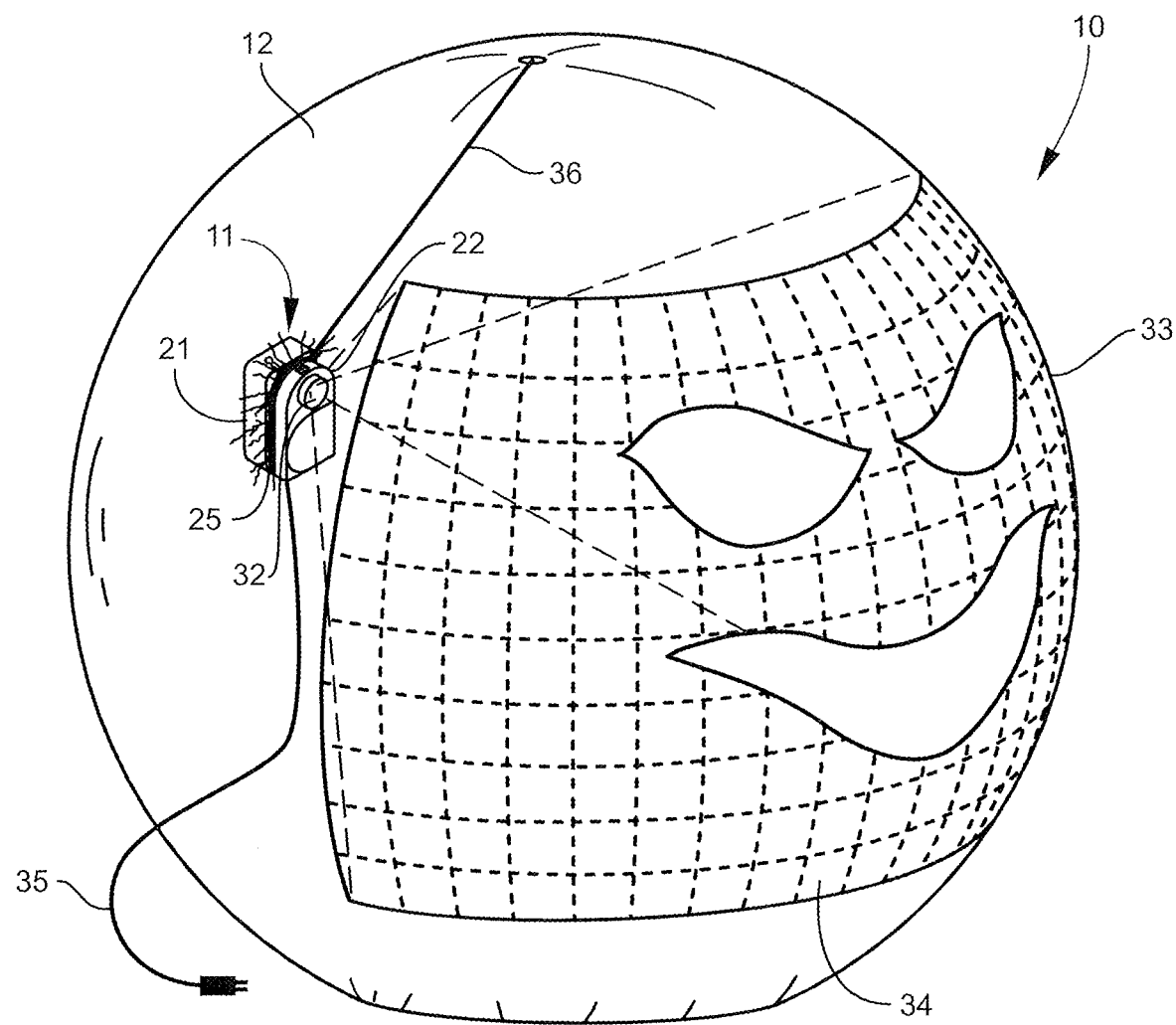
FIG. 1 is a perspective view of an constant-air inflatable decoration according to one exemplary embodiment of the present disclosure.
Figure 5:
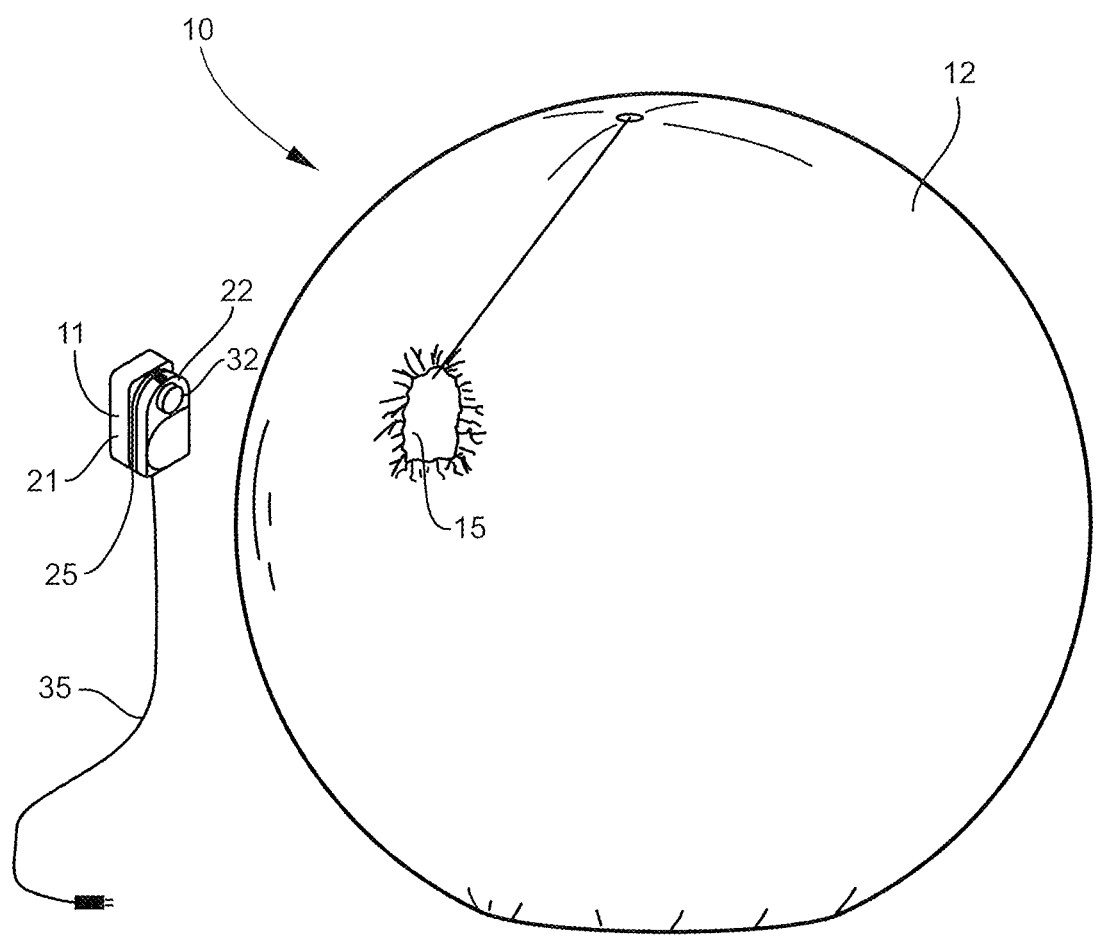
FIG. 5 is a perspective view showing the combined blower/projector unit detached from the inflation port of the inflatable body.

Referring now specifically to the drawings, a constant-air inflatable decoration according to one exemplary embodiment of the present disclosure is illustrated in FIG. 1 and shown generally at broad reference numeral 10. The inflatable decoration 10 is especially applicable for use outdoors during holidays, birthdays, special events and other such occasions. Unlike traditional inflatables with static screen-printed images, the present decoration 10 utilizes a combination blower/projector unit 11 (described further below) to display selectively exchangeable images or a moving sequence of images creating an animation.

Figure 10:
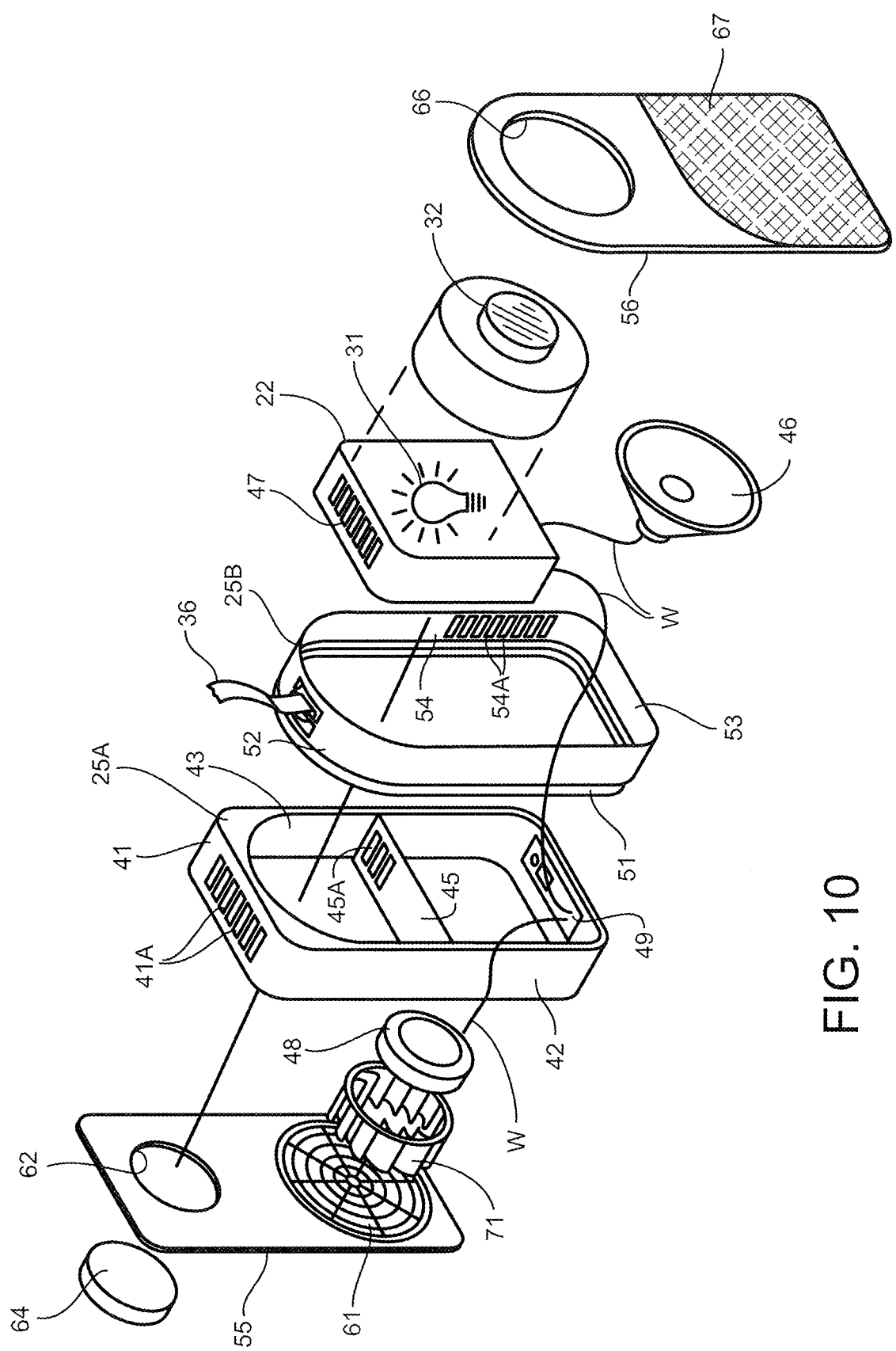
FIG. 10 is an exploded perspective view showing individual components of the exemplary blower/projector unit.

Referring to FIGS. 1-5, the exemplary decoration 10 comprises an inflatable body 12 defined by walls, and having an inflation port 15 configured for receiving the combination blower/projector unit 11. The blower/projector unit 11 is releasably attached to the body 12 at the inflation port 15, and incorporates both an electric blower 21 and video projector 22 in a single housing assembly 25. In exemplary embodiments, the blower/projector unit 11 is secured using a nylon zip tie, cable, bungee cord or other suitable fastener (not shown). When the unit 11 is powered-on, the blower 21 operates to continuously force outside air into the inflatable body 12 to maintain an inflated three-dimensional shape. Once fully inflated, the projector 22 uses an integrated LED lamp 31 and projection lens 32 (FIG. 10) to magnify and cast an image 33 onto an interior display surface 34 of the body 12 the image 33 being visible through the wall of the inflatable body 12 from outside the decoration 10. The blower 21 of the combined unit 11 resides primarily outside of the inflated body 12, while the projector 22 faces inside the inflated body 12. The projector 22 is located within a direct path of airflow generated by the blower 21, thereby continuously cooling the LED lamp 31 and other components of the projector 22 during operation of the blower/proctor unit 11.

The exemplary blower/projector unit 11 may operatively connect to a single power source using a standard 120 VAC power cord 35 connecting to an electrical outlet. The projector 22 may automatically power-on with blower 21 when the power cord 35 is plugged-in to the outlet, or may be independently activated by a dedicated on/off power button "P" see FIG. 9. Alternatively, the power source may include or comprise one or more DC batteries, and optionally a solar panel and solar charge controller for charging the batteries.

Figure 7:
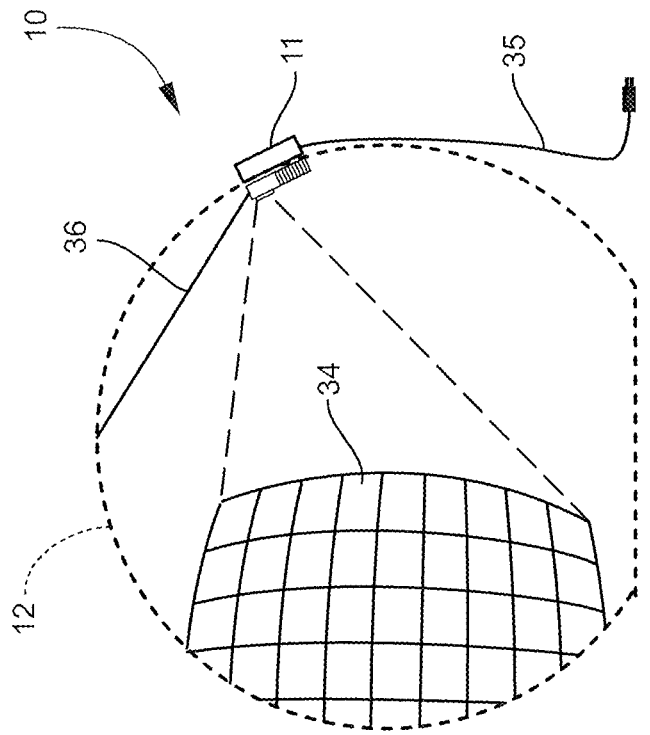
FIGS. 6 and 7 show alternative guide lines used to position the blower/projector unit upon inflation of the body.
Figure 6:
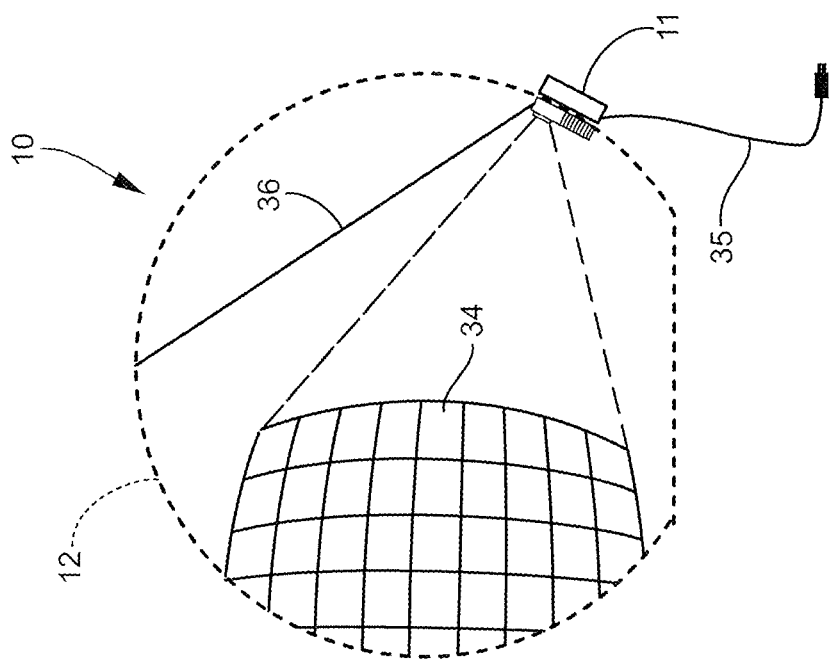

In the exemplary embodiment, an internal flexible guide line 36 is attached to the blower/projector unit 11 and an inside wall of the inflatable body 12, such that when the body 12 is fully inflated the guide line 36 serves to properly align the projection lens 32 relative to the display surface 34. As illustrated in FIGS. 6 and 7, the internal guide line 36 may be attached inside the inflatable body 12 at multiple different points and may be of any suitable length. The exemplary body 12 is fabricated of a durable weather-resistant translucent (or "shine-through") material including cloth, polyester, vinyl, nylon, polyvinyl chloride, PVC-coated vinyl, PVC-coated nylon or the like. The body 12 can be fully deflated into a substantially flat condition and folded for convenient packaging, transport and storage.

Combination Blower/Projector Unit 11

Referring to FIGS. 1 and 8-11, as indicated above the exemplary blower/projector unit 11 of inflatable decoration 10 combines the electric blower 21 and video projector 22 in a single housing assembly 25. The housing assembly 25 includes a weather-resistant outside housing section 25A residing primarily outside of the inflatable body 12 and an inside housing section 25B residing primarily inside of the inflatable body 12. The outside housing section 25A has a vented top wall 41, opposing solid side walls 42, 43 and bottom wall 44, and an intermediate vented partition 45 extending between the side walls 42, 43. The partition 45 divides the outside housing section 25A into separate top and bottom compartments. The top compartment houses the projector 22, while the bottom compartment houses the blower 21 and a loudspeaker 46. The LED lamp 31 of projector 22 is contained inside a vented casing 47 and operatively connects to the projection lens 32. The blower motor 48, projector 22 and loudspeaker 46 are electrically connected via wires "W" to a printed circuit board 49. The inside housing section 25B has a perimeter flange 51 for joining the housing sections 25A, 25B together, a solid arcuate top wall 52, a solid bottom wall 53, and a vented side wall 54. The top wall 52 of housing section 25B may also have a recessed bar "B" for attaching the guide line 36.

When assembled together, the outside and inside housing sections 25A, 25B are sandwiched between outside and inside covers 55 and 56. The outside cover 55 has a perforated blower intake guard 61 and a circular opening 62 for receiving a lens adjustment dial 64. The adjustment dial 64 is operatively connected to the projector 22, and used to manual adjust the focus and orientation of the projection lens 32. The inside cover 56 has a circular opening 66 for receiving the projection lens 32 and a mesh fabric screen 67 for protecting the loudspeaker 46. In one exemplary embodiment, the projector 22 utilizes a short throw lens 32 with electronic circuitry and software operable to modify the geometry of the image projected onto the display surface 34, such that the angled projection appears as a normal rectangle.

During prolong operation of the combined blower/projector unit 11, the LED lamp 31 and other components of projector 22 may generate excessive heat. This heat is continuously dissipated and the projector 22 cooled by intake airflow generated by the blower 21. The blower fan 71 draws ambient air through the intake guard 61 and into the bottom compartment of the outside housing section 25A of housing assembly 25. Airflow is simultaneously channeled into the inflatable body 12 through the vent 54A of side wall 54 of inside housing section 25B, and into the top compartment of outside housing section 25A through the vent 45A of partition 45. Airflow entering the top compartment of housing section 25A continuously cools the LED lamp 31 and other components of the projector 22 before exhausting to the outside through the vent 41A of top wall 41.

Figure 11:
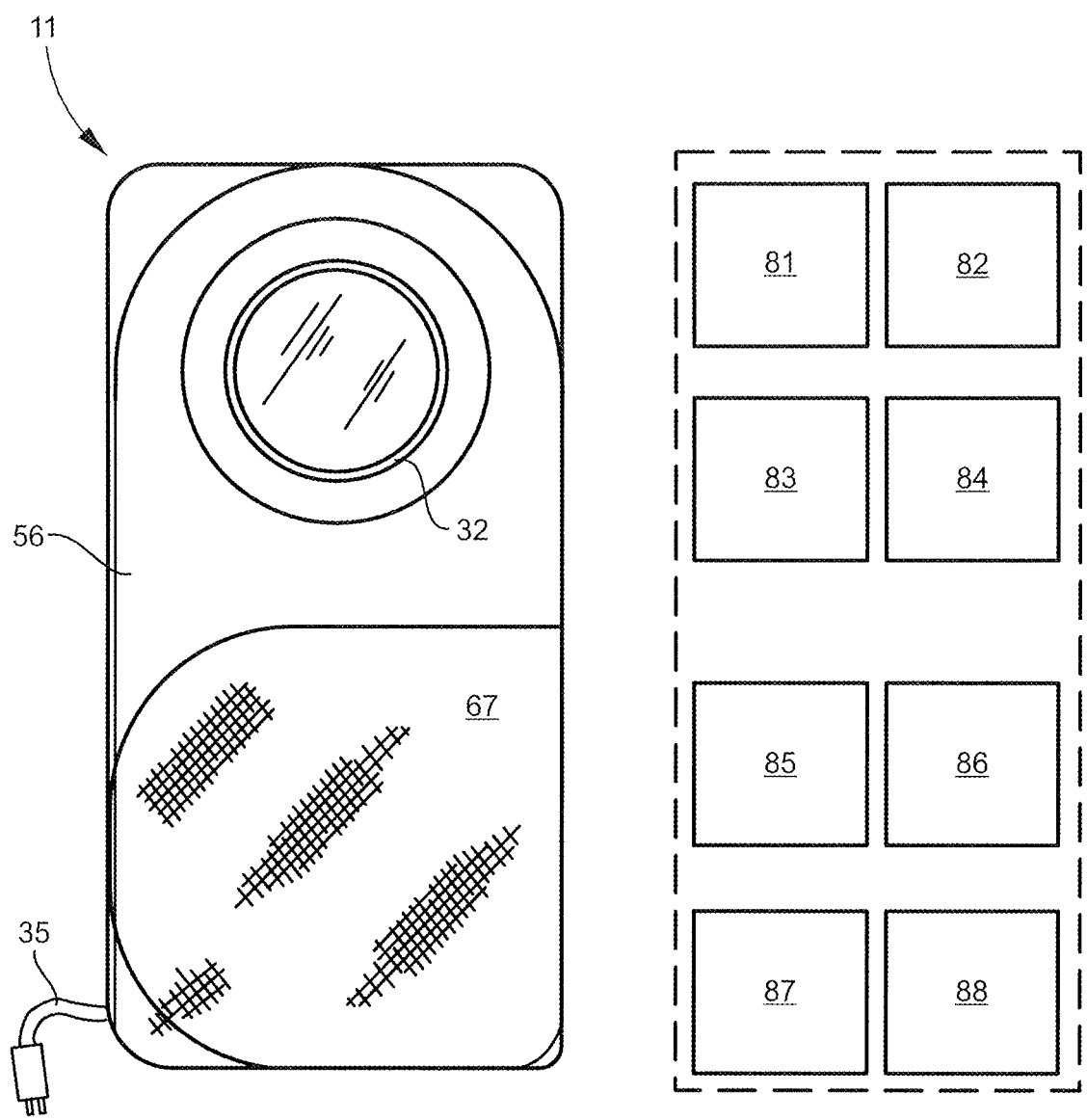
FIG. 11 is diagrammatic view showing various integrated features of the exemplary blower/projector unit.
Figure 12:
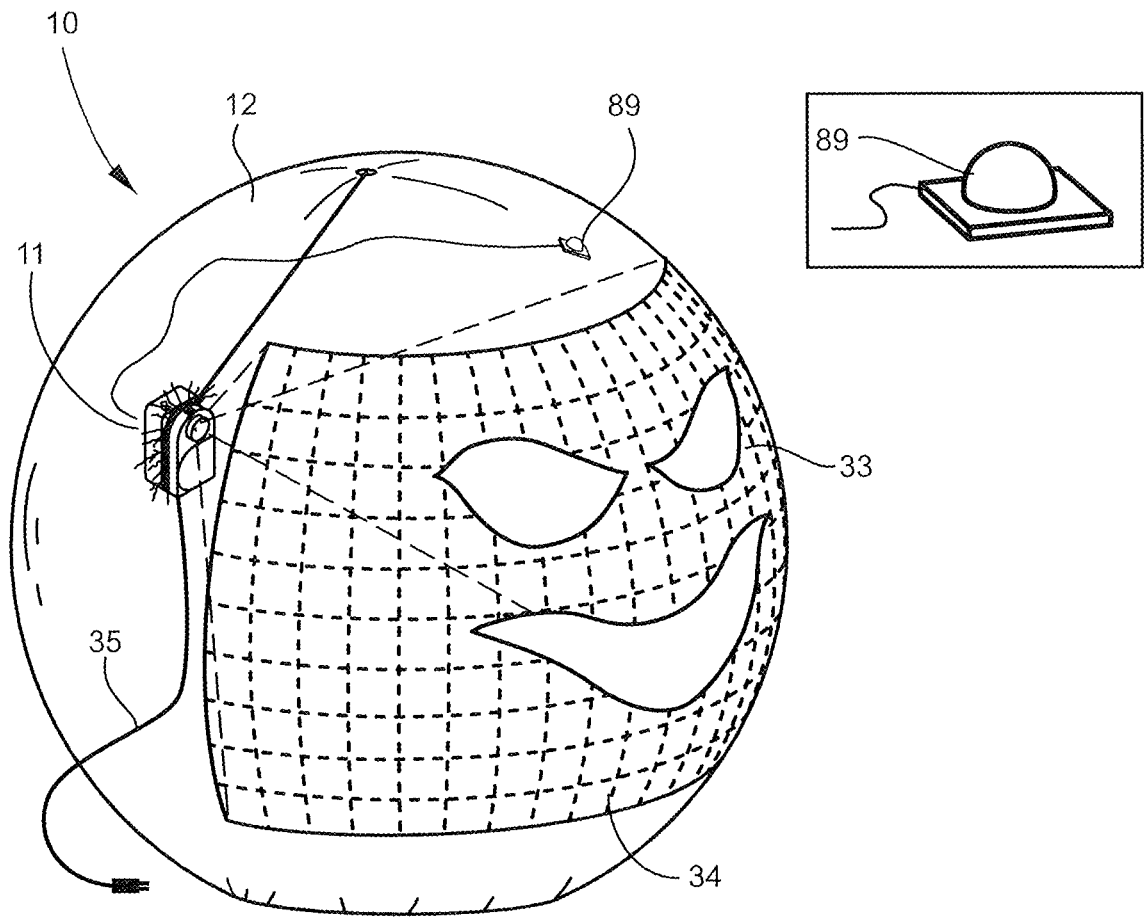

As shown diagrammatically in FIG. 11, the exemplary combined blower/projector unit 11 may incorporate integrated components including (e.g.) USB input 81, HDMI input 82, wireless video HDMI receiver 83, RGB computer input 84, Bluetooth receiver 85, Bluetooth transmitter 86, built-in WiFi 87, and persistent internal or flash memory 88. In one embodiment, the exemplary inflatable decoration 10 incorporating combination blower/projector unit 11 includes one or more electronic sensors 89 (FIG. 12) for detecting motion and/or sound within a predetermined zone around the decoration 10. For example, the sensor 89 may detect when a person is in close proximity to the inflatable decoration 10, and in response may activate the projector and/or generate a particular sound. Additionally, a smartphone 91 and other mobile device with wireless connectivity may be used with a mobile app 92 to select a desired media file 93 to be loaded or streamed by the inflatable decoration 10, as demonstrated in FIG. 13.

Figure 14:
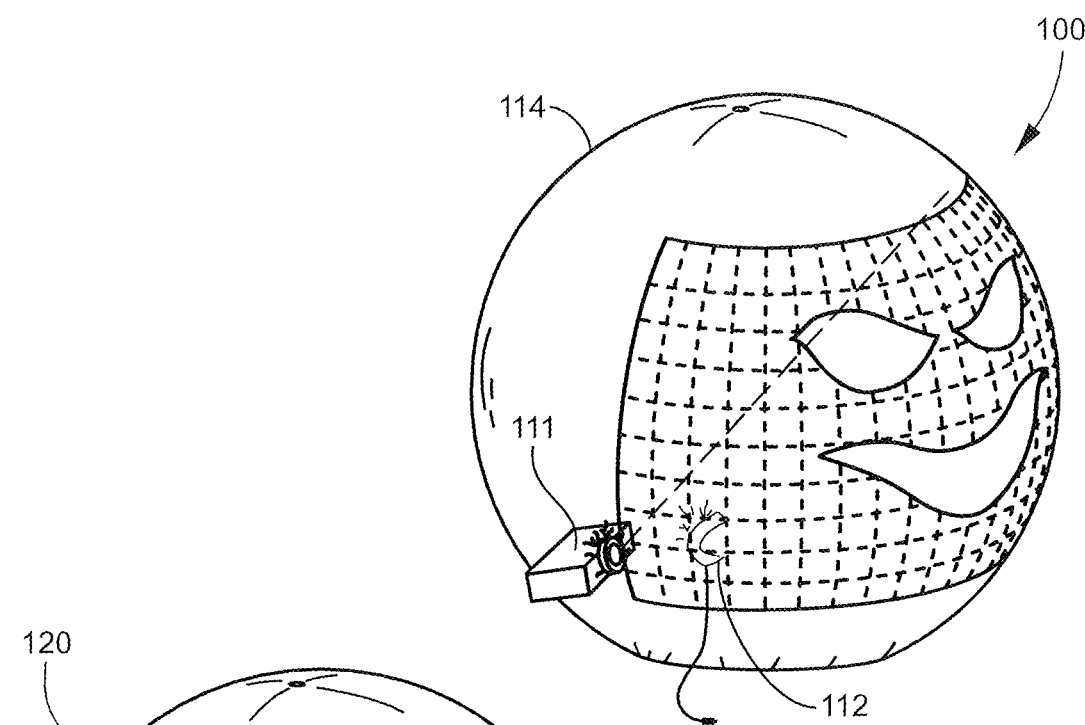
FIGS. 14 and 15 are views of an alternative exemplary embodiment of the present inflatable decoration using an independent projector to cast a display from the rear of the decoration.
Figure 16:
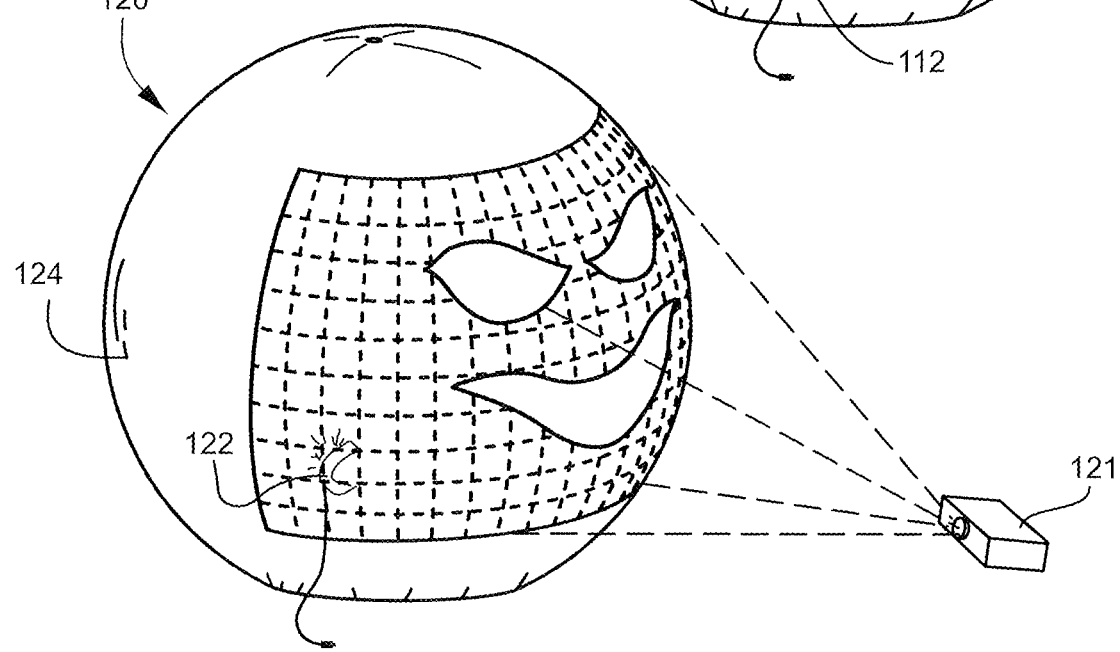
FIG. 16 shows a further alternative exemplary embodiment of the present inflatable decoration using an independent projector to cast a display from the front of the decoration.
Figure 15:
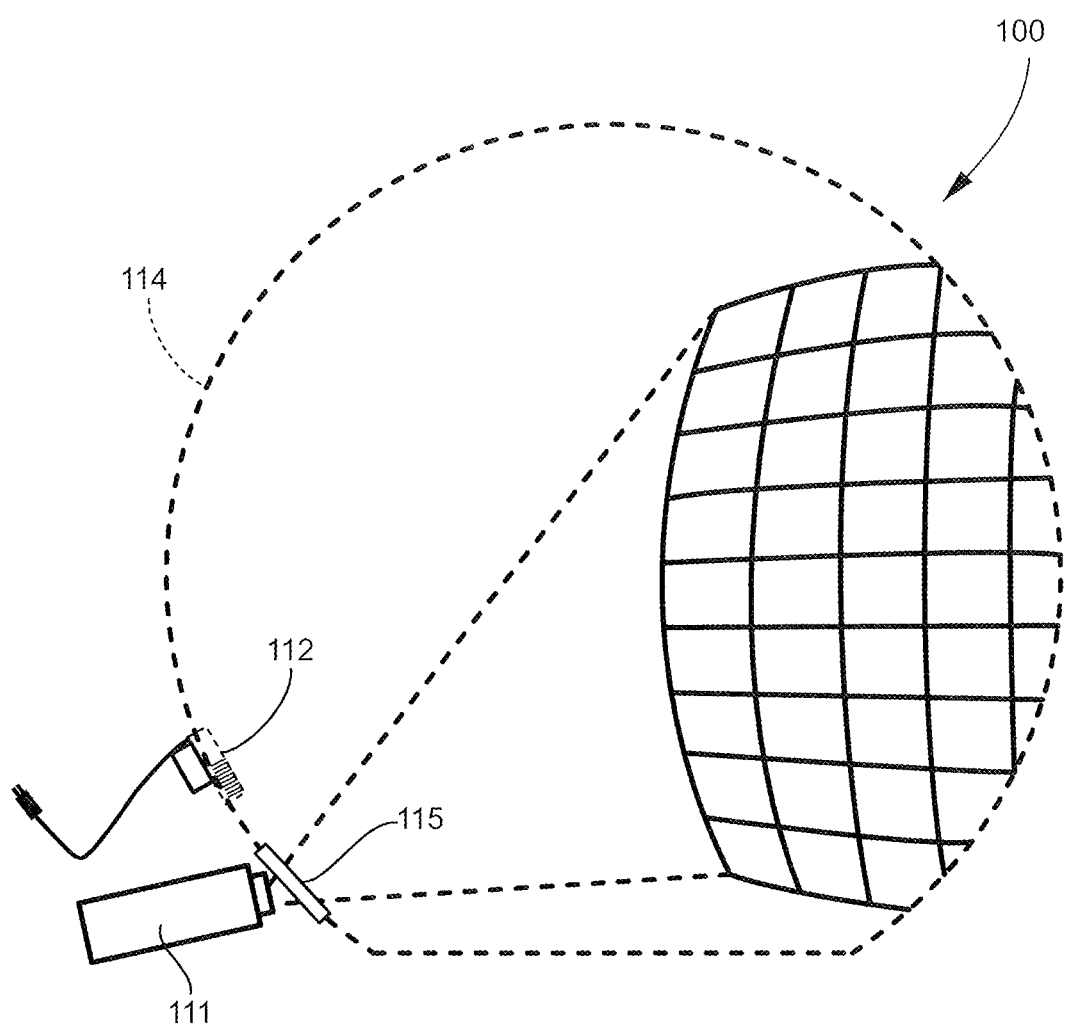
Figure 17:
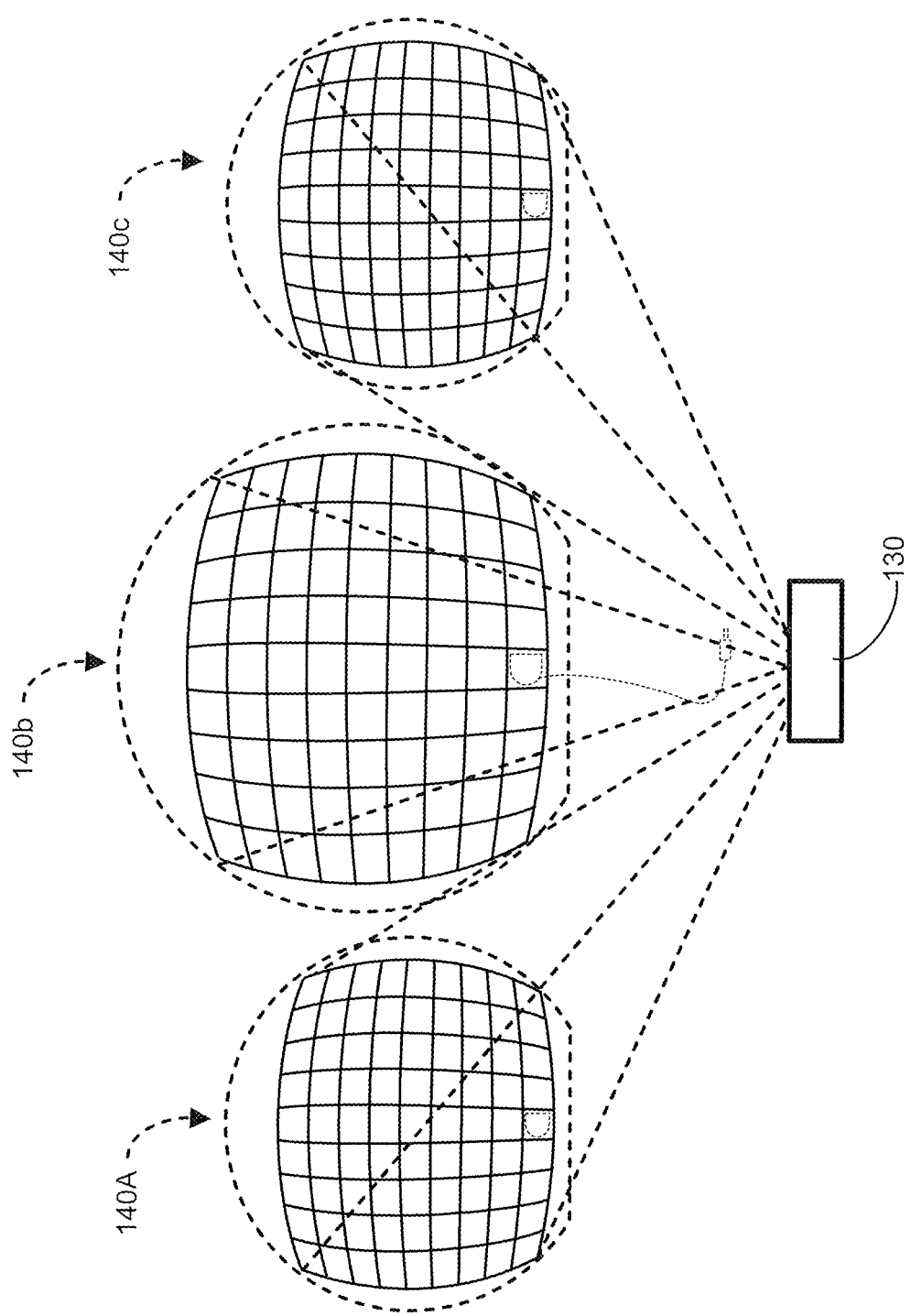
FIG. 17 illustrates the use of a single projector to cast a display on multiple inflatable decoration.
Figure 18:
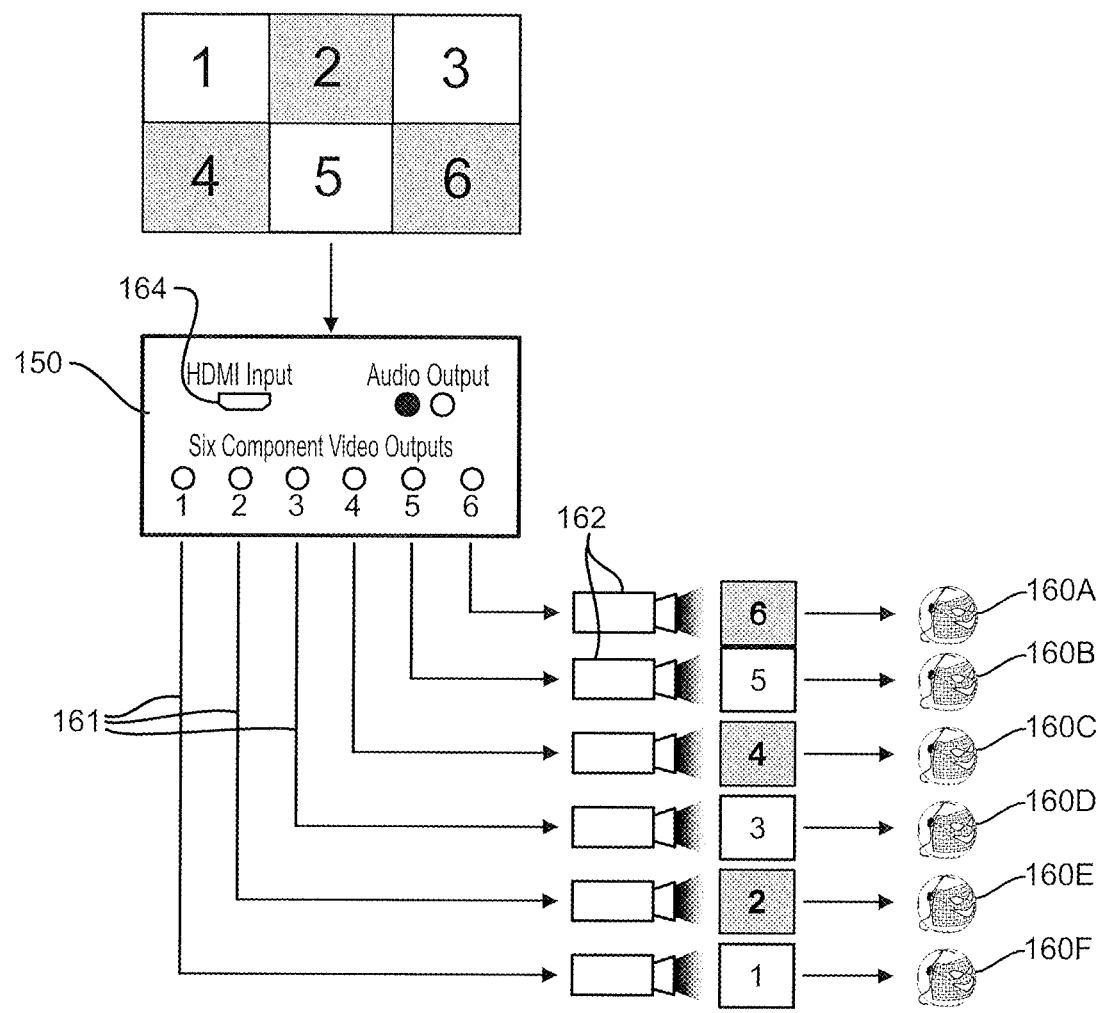
FIG. 18 show a single media controller applicable for controlling output to multiple projectors associated with multiple inflatable decorations.

FIGS. 14 and 15 illustrate a further alternative embodiment of the exemplary inflatable decoration 100. In this embodiment, the projector 111 and blower 112 operate independent of one another with the projector 111 arranged to project the selected media onto the display surface of the inflatable body 114 through a transparent panel 115 located at the rear of the body. In yet another exemplary embodiment of the decorative inflatable 120 shown in FIG. 16, the projector 121 and blower 122 operate independent of one another with the projector 121 arranged in front of the inflatable body 124 to project the selected media onto an outside of the display surface. In the embodiment shown in FIG. 17, a single projector 130 may be used to cast multiple images to multiple inflatable decorations 140A, 140B, 140C. In the embodiment of FIG. 18, a single media controller 150 is operatively connected a multiple inflatable decorations 160A-160F. The media controller 150 has a plurality of individual media outputs 161 designed to transmit audio and video data to a corresponding plurality of projectors 162 each projector 162 being associated with one or more inflatable decorations 160A-160F. The media controller 150 may further comprise at least one media input 164 designed to receive audio and video data from external sources. A user may direct the media controller 150 using a wirelessly connected smartphone or other mobile device, and an mobile app.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) is not intended. Additionally, it is not intended that the scope of patent protection afforded the present invention be defined by reading into any claim a limitation found herein that does not explicitly appear in the claim itself.

What is claimed:

1. A constant-air inflatable decoration, comprising:
an inflatable body defined by walls;
an inflation port formed with one of said walls;
a blower located at said inflation port and comprising a blower fan adapted for generating continuous airflow from an outside of said inflatable body to an inside of said inflatable body, whereby said blower operates to continuously force air into said inflatable body to maintain an inflated three-dimensional shape;
a projector mounted adjacent said blower and facing inside said inflatable body, and said projector comprising a light source and a projection lens configured for magnifying and casting an image onto an opposite display surface of said inflatable body, whereby the image cast onto said display surface is visible outside of said decoration;
said projector residing within a direct path of airflow generated by said blower fan, thereby continuously cooling said light source of said projector during operation of said blower, and wherein said projector comprises a hand dial accessible from the outside of said inflatable body for manually adjusting an orientation of said projection lens.

2. The constant-air inflatable decoration according to claim 1, wherein said blower and projector are integrally formed together as a combined blower/projector unit.

3. The constant-air inflatable decoration according to claim 2, wherein said blower/projector unit comprises a vented interior housing section residing inside of said inflatable body and configured to simultaneously channel airflow to said light source of said projector and to the inside of said inflatable body.

4. The constant-air inflatable decoration according to claim 3, wherein said blower/projector unit further comprises a vented outside housing section residing outside of said inflatable body.

5. The constant-air inflatable decoration according to claim 2, wherein said blower/projector unit operatively connects to a single power source.

6. The constant-air inflatable decoration according to claim 2, wherein said blower/projector unit is releasably mounted to the wall of said inflatable body at said inflation port, such that said blower fluidly communicates with the outside of inflatable body and said projection lens of said projector resides inside of said inflatable body.

7. The constant-air inflatable decoration according to claim 2, wherein said image comprises one of a moving sequence of images creating an animation.

8. The constant-air inflatable decoration according to claim 1, wherein said image comprises a single still frame.

9. The constant-air inflatable decoration according to claim 1, wherein said inflatable body is constructed of a material selected from a group consisting of cloth, polyester, vinyl, nylon, polyvinyl chloride, PVC-coated vinyl and PVC-coated nylon.

10. The constant-air inflatable decoration according to claim 1, wherein said projector comprises integrated components selected from a group consisting of USB input, HDMI input, wireless video HDMI receiver, RGB computer input, internal speakers, Bluetooth receiver, Bluetooth transmitter, and built-in WiFi.

11. The constant-air inflatable decoration according to claim 1, wherein said projector comprises external nonvolatile electronic storage selected from a group consisting of a USB flash drive and an SD memory card.

12. The constant-air inflatable decoration according to claim 1, wherein said light source of said projector comprises one of a group consisting of a lamp and laser.

13. The constant-air inflatable decoration according to claim 1, wherein said projection lens of said projector comprises a short throw lens.

14. The constant-air inflatable decoration according to claim 1, and comprising an internal guide line attached to said projector and a wall of said inflatable body, such that said guide line serves to align said projection lens relative to the display surface upon inflation of said body.

15. A method for providing a constant-air inflatable decoration, the method comprising:
   locating a blower at an inflation port formed with an inflatable body of the decoration, the blower comprising a blower fan adapted for generating continuous airflow from an outside of the inflatable body to an inside of the inflatable body, whereby the blower operates to continuously force air into the inflatable body to maintain an inflated three-dimensional shape;
   mounting a projector adjacent the blower to face inside the inflatable body, the projector comprising a light source and a projection lens configured for magnifying and casting an image onto a display surface of the inflatable body, whereby the image cast onto the display surface is visible outside of the decoration;
   using airflow generated by the blower fan, continuously cooling the light source of the projector during operation of the blower; and
   operatively connecting a plurality of inflatable decorations to a single external media controller, the media controller having a plurality of individual media outputs designed to transmit audio and video data to a corresponding plurality of projectors.

16. The method according to claim 15, wherein the media controller further comprises at least one media input designed to receive audio and video data from external sources.

17. The method according to claim 15, and comprising wirelessly connecting the media controller to a mobile device.

18. The method according to claim 15, and comprising wirelessly connecting the projector to a mobile device.

19. A constant-air inflatable decoration, comprising:
   an inflatable body defined by walls;
   an inflation port formed with one of said walls;
   a blower located at said inflation port and comprising a blower fan adapted for generating continuous airflow from an outside of said inflatable body to an inside of said inflatable body, whereby said blower operates to continuously force air into said inflatable body to maintain an inflated three-dimensional shape;
   a projector mounted adjacent said blower and facing inside said inflatable body, and said projector comprising a light source and a projection lens configured for magnifying and casting an image onto an opposite display surface of said inflatable body, whereby the image cast onto said display surface is visible outside of said decoration;
   said projector residing within a direct path of airflow generated by said blower fan, thereby continuously cooling said light source of said projector during operation of said blower; and
   an internal guide line attached to said projector and a wall of said inflatable body, such that said guide line serves to align said projection lens relative to the display surface upon inflation of said body.

* * * * *